T. A. BRYSON.
THRUST BEARING FOR CENTRIFUGAL MACHINES.
APPLICATION FILED SEPT. 10, 1915.

1,235,548.

Patented Aug. 7, 1917.

WITNESSES

INVENTOR
T. A. Bryson
BY John D. Morgan
ATTORNEY

UNITED STATES PATENT OFFICE.

TANDY A. BRYSON, OF TROY, NEW YORK, ASSIGNOR TO TOLHURST MACHINE WORKS, A CORPORATION OF NEW YORK.

THRUST-BEARING FOR CENTRIFUGAL MACHINES.

1,235,548.     Specification of Letters Patent.     Patented Aug. 7, 1917.

Application filed September 10, 1915. Serial No. 49,922.

*To all whom it may concern:*

Be it known that I, TANDY A. BRYSON, a citizen of the United States, and a resident of Troy, New York, have invented new and useful Improvements in Thrust-Bearings for Centrifugal Machines, of which the following is a specification.

The invention relates to a support or suspension for centrifugal machines which have a basket for the materials to be dried or separated, the basket being suspended on a rapidly rotating shaft. The invention provides a resilient support or suspension for the shaft, which resists and takes up movement of the shaft due to unbalanced loading of the basket and prevents wearing and destructive movement of the resilient member and coöperating members of the shaft support or suspension, without interfering with the motion preventing and absorbing action and without multiplication of the machine parts. Other objects of the invention will be in part set forth hereinafter, and in part will be obvious herefrom.

The invention consists in the novel parts, constructions, combinations and improvements herein shown and described.

The accompanying drawings, referred to herein and constituting a part hereof, illustrate an embodiment of the invention, and in conjunction with the description serve to explain the principles thereof.

Figure 1:
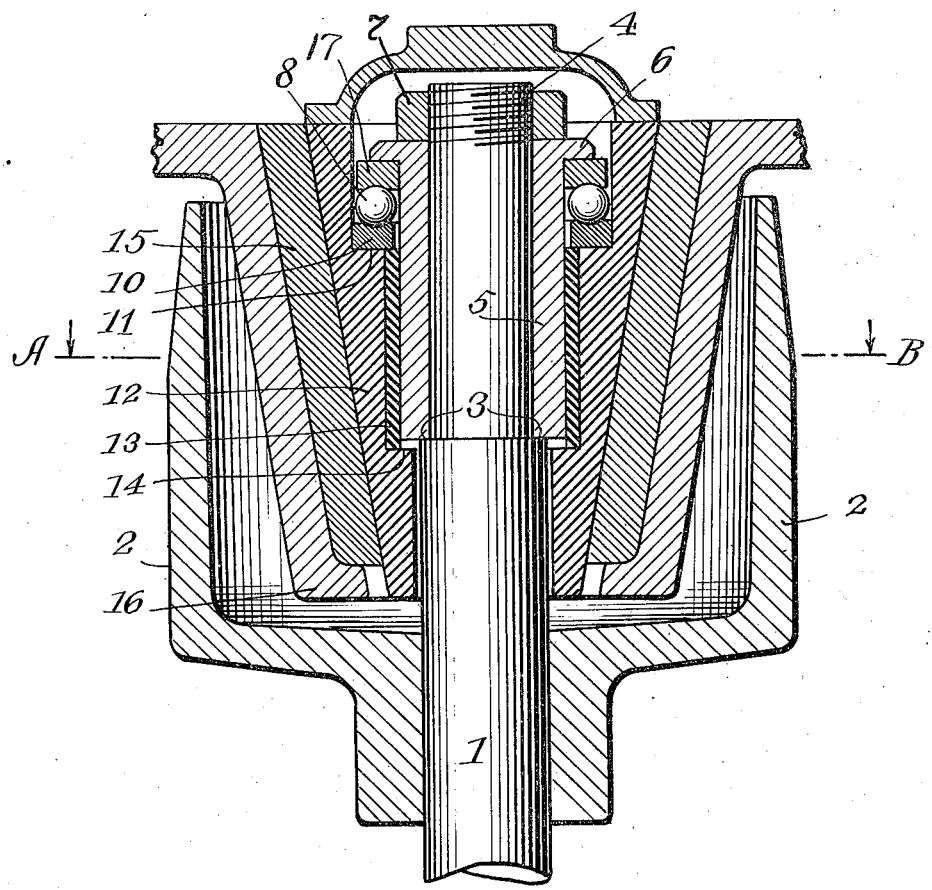
Figure 2:
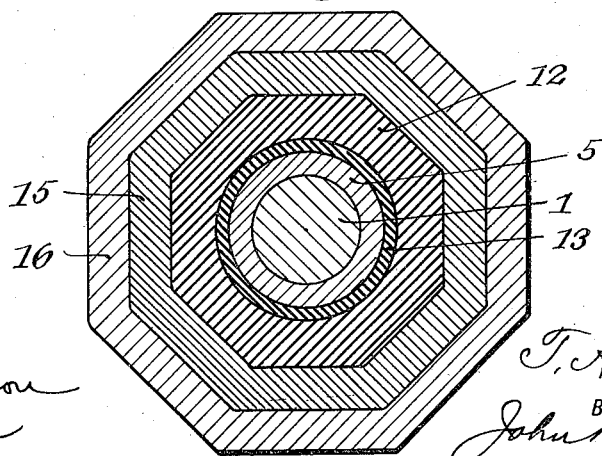

Of the drawings:

Figure 1 is a fragmentary vertical section of a shaft suspension constructed in accordance with the invention; and Fig. 2 is a full horizontal section on the line A—B of Fig. 1, with the driving pulley omitted.

In a mechanism of this character the suspension for the rapidly rotating vertical shaft which carries the basket with its load of unbalanced material is subjected to a great deal of strain and wear, and it is very desirable to have the bearing of few parts and of simple construction, able to resist wear, and at the same time highly efficient in absorbing and resisting movement of the shaft due to the rapidly rotating unbalanced load. By my invention, a very full and direct action of the resilient motion absorbing and resisting member or material is obtained, and at the same time the excessive tendency to wear and to unnecessary movement of the machine parts due to heavy load and high velocity of rotation is eliminated.

Referring in detail to the illustrated embodiment, the vertical shaft 1 carries at its lower end the basket (not shown) for the material to be dried or separated. The shaft 1 is rotated in a suitable manner, as by a pulley 2 fixed thereto.

The shaft 1 is narrowed or cut down near its upper end, providing a shoulder 3, and the shaft at its upper end has a screw thread 4. Surrounding the narrowed part of shaft 1 is a sleeve 5, said sleeve having its lower end resting against the shoulder 3. The upper end of the sleeve 5 is provided with a horizontal annular flange 6, and a nut 7 threaded onto the screw thread 4 presses against the flange 6 and thus holds the sleeve 5 and shaft 1 firmly together, the pulley 2 rotating the shaft and the rotating shaft and its suspended basket being supported by the flange 6.

In the form of support provided for the flange 6, a flat ring 17 encircles the sleeve 5 just beneath the flange, said ring 7 having a ball race formed on its lower side. In this race is a series of balls 8, upon which the ring 7 rests. The balls 8 rest in a race formed in the upper surface of a flat ring 10. The ring 10 rests on a horizontal shoulder 11 in the housing 12. A filling ring or sleeve 13 is between the housing 12 and shaft 1, said sleeve 13 resting on a shoulder 14 formed on the housing.

The exterior of the hollow housing 12 is of inverted pyramidal form and is polygonal in horizontal cross section, as will appear from Fig. 2. The housing is supported within the resilient motion and strain resisting and absorbing member 15, which latter is likewise of hollow inverted polygonal and pyramidal form, and fits closely about the housing 12.

The member 15 is supported in a frame piece or support 16, which support on its interior is likewise of inverted pyramidal form, as shown in Fig. 2, and at its bottom end it has an inwardly projecting flange or floor 16 which supports the lower end of the resilient member 15. In my preferred form all these parts are polygonal, although some of them may be made circular. It will be understood also that other changes may be made from the precise form shown and described without departing from the principles of the invention and without sacrificing its chief advantages.

My improved form of the suspension parts prevents undesirable and harmful rotational movement or displacement of the housing and of the resilient material 15, while the resilient material is present all about the shaft and is everywhere in position to take the ever rapidly shifting thrust or lateral gyratory pressure of the shaft. The pyramidal form permits take up of all wear without adjustments. While the housing is held against rotation without additional parts and without interference with the motion preventing and motion absorbing action, the shaft is suspended truly and freely upon a traveling bearing and without any rotational strain or force acting against its fastening nut.

What I claim as my invention is:—

1. In a centrifugal machine a basket suspending and rotating shaft, a housing from which the shaft is suspended, the housing being polygonal on its exterior, a thrust absorbing and resisting member about the housing and of polygonal interior form to fit the housing, and a support about the thrust absorbing member.

2. In a centrifugal machine a basket suspending and rotating shaft, a housing from which the shaft is suspended, the housing being pyramidal on its exterior, a thrust absorbing and resisting member about the housing and of pyramidal interior form to fit the housing, and a support about the thrust absorbing member.

3. In a centrifugal machine a basket suspending and rotating shaft, a thrust absorbing and resisting member, polygonal on its exterior, and a stationary support thereabout of interior polygonal form, and engaging its polygonal exterior.

4. In a centrifugal machine a basket suspending and rotating shaft, a thrust absorbing and resisting member, pyramidal on its exterior, and a stationary support thereabout of interior pyramidal form, and engaging its pyramidal exterior.

In testimony whereof, I have signed my name to this specification, in the presence of two subscribing witnesses.

TANDY A. BRYSON.

Witnesses:
DAVID C. PATTON,
M. K. BUSKIN.